United States Patent
Iizuka et al.

(10) Patent No.: US 8,369,000 B2
(45) Date of Patent: Feb. 5, 2013

(54) REFLECTION-MINIMIZED PHOTONIC CRYSTAL AND DEVICE UTILIZING SAME

(75) Inventors: Hideo Iizuka, Ann Arbor, MI (US); Nader Engheta, Berwyn, PA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 391 days.

(21) Appl. No.: 12/708,860

(22) Filed: Feb. 19, 2010

(65) Prior Publication Data

US 2011/0205617 A1    Aug. 25, 2011

(51) Int. Cl.
G02F 1/29    (2006.01)
(52) U.S. Cl. ...................................................... 359/322
(58) Field of Classification Search .................... 359/322
See application file for complete search history.

(56) References Cited

U.S. PATENT DOCUMENTS

| | | | |
|---|---|---|---|
| 7,200,312 B2 | 4/2007 | Furuya et al. | |
| 7,242,837 B2 | 7/2007 | Tlaneau et al. | |
| 7,535,946 B2 | 5/2009 | Nagatomo et al. | |
| 2006/0182400 A1* | 8/2006 | Furuya et al. ................. | 385/129 |

OTHER PUBLICATIONS

Teun-Teun Kim, Sun-Goo Lee, Myeong-Woo-Kim, Hae Yong Park, Jae-Eun Kim, "Experimental Demonstration of Reflection Minimization at Two-Dimensional Photonic Crystal Interfaces Via Antireflection Structures," Jul. 10, 2009, Applied Physics Letters 95, 011119 (2009), American Institute of Physics.

Yoshikazu Asano, "Millimeter-Wave Holographic Radar for Automotive Applications," Toyota Central Research and Development Laboratories Inc., Sensing System Laboratory, Nagakute, Aichi, 480-1192, Japan.
Mark E. Russell, Clifford A. Drubin, Anthony S. Marinilli, W. Gordon Woodington, Michael J. Del Checcolo, "Integrated Automotive Sensors," IEEE Transactions on Microwave Theory and Techniques, vol. 50, No. 3, Mar. 2002.
B. Momeni and A. Adibi, "Adiabatic Matching Stage for Coupling of Light to Extended Bloch Modes of Photonic Crystals," Applied Physics Letters 87, 171104 2005 American Institute of Physics.
Jeremy Witzens, Michael Hochberg, Thomas Baehr-Jones, Axel Scherer, "Mode Matching Interface for Efficient Coupling of Light Into Planar Photonic Crystals," Physical Review E 69, 046609 2004, The American Physical Society.
Toshihiko Baba and Daisuke Ohsaki, "Interfaces of Photonic Crystals for High Efficiency Light Transmission," Jpn. J. Appl. Phys. vol. 40 (2001) pp. 5920-5924, Part 1, No. 10, Oct. 2001, The Japan Society of Applied Physics.
Hideo Kosaka, Takayuki Kawashima, Akihisa Tomita, Masaya Notomi, Toshiaki Tamarura, Takashi Sato, Shojiro Kawakami, "Superprism Phenomena in Photonic Crystals: Toward Microscale Lightwave Circuits," Journal of Lightwave Technology, vol. 17, No. 11, Nov. 1999 IEEE.

(Continued)

Primary Examiner — James Jones
(74) Attorney, Agent, or Firm — Christopher G. Darrow

(57) ABSTRACT

A photonic crystal structure that is composed of a host media having periodic dielectric holes disposed in the media at a period of $a_h$. Each dielectric hole has a radius $r_h$. The host media has an absolute refractive index expressed as $|n_h|$ that is less than 0.2. The photonic crystal structure has at least one reflection minimization layer disposed at an air/photonic crystal interface. The reflection minimization layer has periodic dielectric holes disposed therein at a period $a_m$ with each dielectric hole having a radius $r_m$ such that $a_h = a_m$ and $r_m > r_h$ and a beam steerable device including the photonic crystal structure. The device having a scanning rate of larger than 1 KHz and a scanning angle up to ±25 degrees.

26 Claims, 5 Drawing Sheets

OTHER PUBLICATIONS

Karl M. Strohm, Hans-Ludwig Bloecher, Robert Schneider, Josef Wenger, "Development of Future Short Range Radar Technology," Daimler-Chrysler AG, Research & Technology, Wilhelm-Runge-Str. 11, 89081 Ulm, Germany, 2nd European Radar Conference 2005 Paris.

R. Schneider and J. Wenger, "System Aspects for Future Automotive Radar," DaimlerChrysler Research and Technology, Wilhelm-Runge-Str. 11, D-89081 Ulm Germany, 0-7803-5135-5/99 1999 IEEE.

Hideo Iizuka, Toshiaki Watanabe, Kazuo Sato, Kunitoshi Nishikawa, Millimeter-Wave Microstrip Array Antenna for Automotive Radars, Toyota Central Research & Development Labs, Inc., Aichi-ken, 480-1192 Japan, IEICE Trans. Commun., vol. E86-B, No. 9 Sep. 2003.

Holger H. Meinel, Commercial Applications of Millimeterwaves History, Present Status, and Future Trends, IEEE Transactions on Microwave Theory and Techniques, vol. 43, No. 7, Jul. 1995.

L. Wu, M. Mazilu, and T. F. Krauss, "Beam Steering in Planar Photonic Crystals: from Superprism to Supercollimator," J. Lightwave Tech., 21, 561-566 (2003).

L. Wu, M. Mazilu, J. F. Gallet, and T. F. Krauss, "Dual lattice photonic-crystal beam splitters," Appl. Phys. Lett., 86, 211106 (2005).

* cited by examiner

REFLECTION-MINIMIZED PHOTONIC CRYSTAL AND DEVICE UTILIZING SAME

BACKGROUND

The present invention pertains to reflection minimized photonic crystals and to devices utilizing such materials.

Typical 2-dimensional photonic crystals consist of a dielectric slab having periodic dielectric regions present in the form of air holes or dielectric rods in air. For purposes of light propagation, infinite thickness can be assumed. Refractive indices less than 1 and even refractive indices having negative values can be engineered in various photonic crystals.

When there is a mismatch between the refractive index of the photonic crystal and the refractive index of an associated background media or air, certain amounts of light reflection can occur. Light reflection occurs when light incident from a background or air region to the photonic crystal lacks unity of absolute refractive index. In situations where the absolute refractive index is much less than 1 or much larger than 1, this disunity results in large amounts reflection. This limits the transmissive effectiveness of the photonic crystal.

In beam steering applications utilizing superprism effects, large refraction angles are achieved by engineering photonic crystal structures with extremely small absolute refractive indices at the crystal interface. This enables significant refraction corresponding to small variations in the incident angle as light enters the crystal structure. The need for ever smaller absolute refractive indices as well as negative refractive indices increases as the need for devices with ever wider beam steering angles increases.

Such small absolute refractive index values result in large amounts of reflection at the interface between the photonic crystal and air or the background media. Such reflection phenomena limit the effectiveness of the photonic crystal structure and any associated device, such as a beam steering structure and super prism lenses.

It would be desirable to provide a reflection minimized photonic crystal structure. Various methods have been proposed, but the need for effective reflection minimization remains. Devices utilizing photonic crystals with effective reflection minimization would find application in numerous configurations including but not limited to superprism lenses and beam steering devices such as near vertical-incidence thin structures.

SUMMARY

This disclosure relates to a photonic crystal structure that is composed of a host media having periodic dielectric holes disposed in the media at a period of $a_h$. Each dielectric hole has a radius $r_h$. The host media has an extremely low refractive index that may be expressed as an absolute refractive index expressed as $(\ln_h 1)$ that is less than 0.2. The photonic crystal structure has at least one reflection minimization layer disposed at an interface between the photonic crystal and associated background media. The reflection minimization layer has periodic dielectric holes disposed therein at a period $a_m$ with each dielectric hole having a radius $r_m$ such that $a_h = a_m$ and $r_m > r_h$.

Also disclosed are devices such as lenses and beam steering structures employing such photonic crystal structures. The structures disclosed can achieve scanning angles of at least ±10° and scanning frequencies of 1 KHz or greater. The present disclosure also provides a method for achieving reflection minimization in photonic crystal material having an absolute refractive index less than 0.2.

DESCRIPTION OF THE DRAWINGS

In order to facilitate the present disclosure, reference is made to the following illustrative drawing figures in which like reference numerals are employed where appropriate throughout the various views.

DETAILED DESCRIPTION

Figure 1:
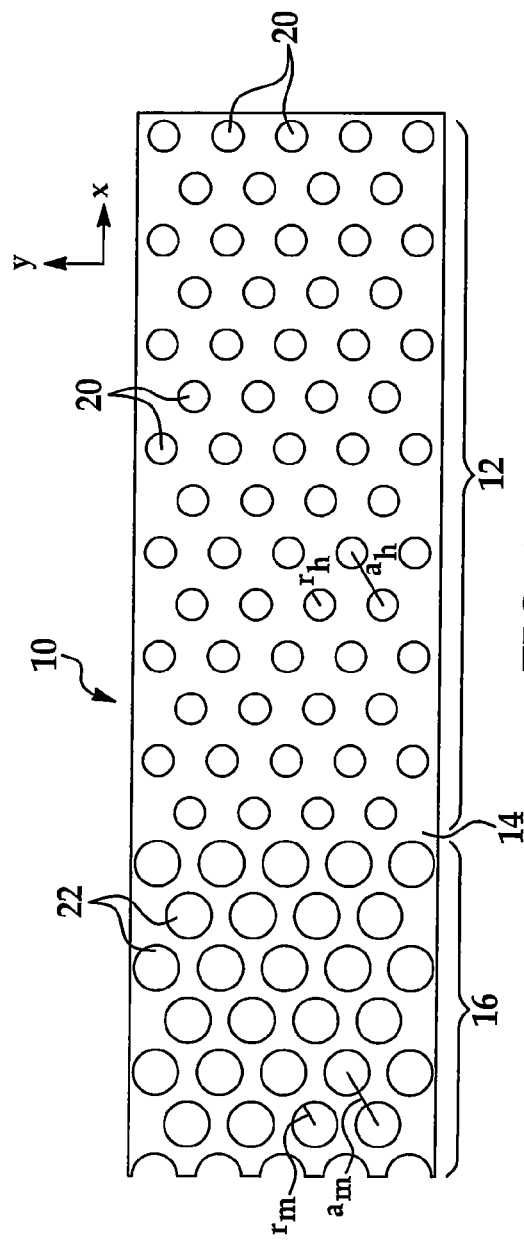
FIG. 1 is a schematic representation of a portion of a photonic crystal structure according to an embodiment of the present invention.

Disclosed herein is a reflection minimized photonic crystal structure composed of a host media with a low absolute refractive index. Also disclosed are devices and structures employing reflection minimized photonic crystals as well as a method for preparing a reflection minimized photonic crystal structure.

Photonic crystals are members of the class of metamaterials in which a refractive index of the structure is spatially changed according to a period corresponding to an optical wavelength. Photonic crystal structures under discussion in the present disclosure are two-dimensional structures that can be employed variously as lenses, WDM dispersers, super prisms, and various optic devices. Other end use applications are contemplated and are within the limits disclosed herein.

The photonic crystal structure disclosed herein includes a host media having an extremely low absolute refractive index.

For purposes of this disclosure, "extremely low refractive index" is a value approaching zero or below. Absolute refractive indices less than 0.2 are employed in specific instances. Variously, the absolute refractive index can be less than 0.1, and absolute refractive index less than 0.085 is contemplated in some situations. The host media may be composed of any suitable material and will have dielectric holes periodically disposed therein at a period $a_h$. The period $a_h$ is measured from the center of one dielectric hole to the center dielectric hole immediately proximate. It is contemplated that each dielectric hole will have up to six dielectric holes at a proximate distance $a_h$, with up to at least four of these holes disposed in either at +x or −x direction relative to the dielectric hole. Each dielectric hole is configured with a radius $r_h$.

The photonic crystal structure further comprises at least one reflection minimization layer disposed at an interface of the host media and a background media. The reflection minimization layer has dielectric holes periodically disposed at a period $a_m$. The period $a_m$ is measured from the center of one dielectric hole to the center of a dielectric hole immediately proximate. It is contemplated that each dielectric hole will have up to six dielectric holes in position proximate at a distance "$a_m$" with at least four dielectric holes disposed at either +x or −x direction relative to the central dielectric hole. In specific embodiments, the overall position pattern of the dielectric holes in the reflection minimization layer will be the same as or similar to the overall position pattern of the dielectric holes in the host media.

In the photonic crystal structure disclosed herein, the value $a_m$ equals the value $a_h$. In other words, the periodic position of the dielectric holes is constant or essentially constant throughout the host media and reflection minimization layer(s).

As broadly construed, the photonic crystal structure disclosed has at least one reflection minimization layer disposed at an interface between the host media and a background media. As used herein, the term "background media" includes air as well as material employed in matching layer(s). In two-dimensional crystal structures, the photonic crystal structure may have at least two such interfaces of interest or concern: the interface where incident light enters the photonic crystal host material at location −x and the interface where the light exits the photonic crystal host material at location +x. The background media in the drawing figures is air. The reflection minimization layer may be positioned at one or both of these interfaces.

Figure 2A:
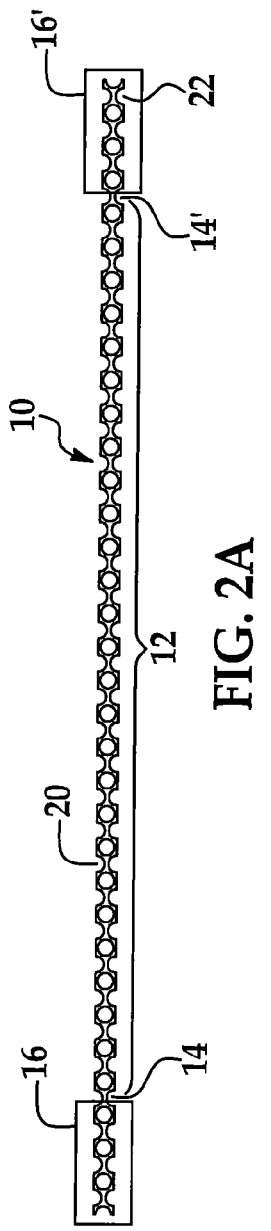
FIG. 2a is a cross-sectional side view representation of a photonic crystal structure according to an embodiment of the present invention.
Figure 2B:
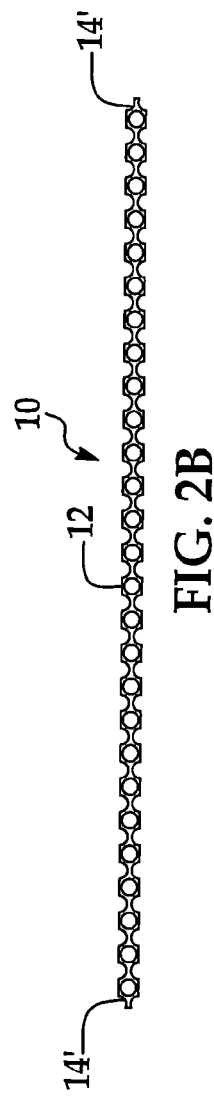
FIG. 2b is a cross-sectional side view representation of a comparative photonic crystal without the reflection minimizing layers.

In the embodiment depicted in FIG. 1, the photonic crystal structure 10 has host media region 12 and a reflection minimization layer 16 located at one interface 14 as at location −x. In the embodiment depicted in FIG. 2, the photonic crystal structure 10 has reflection minimization layers 16, 16' located two interfaces (−x /+x). The reflection minimization layers 16, 16' are opposed to one another with host media 12 intermediate.

The host media region 12 of the photonic crystal structure 10 includes dielectric holes 20 positioned periodically therein. The dielectric holes 20 contain any suitable dielectric material. In the embodiment depicted in FIG. 2, the dielectric material is air. The dielectric holes 20 are disposed in the host media at a period $a_h$. The dielectric holes 20 are circular and have a radius $r_h$.

Dielectric holes 22 present in the reflection minimization layers(s) 16, 16' each have a radius $r_m$. The dielectric hole radius $r_m$ has a value greater than the radius $r_h$ of dielectric holes 20 present in the host media. Therefore $r_m > r_h$. The period or pitch of dielectric holes 22 present in reflection minimization layer(s) 16, 16' is $a_m$ with $a_m = a_h$. In the embodiment depicted in the drawing figures, the dielectric holes are circular in the x-y plane.

In the two-dimensional crystal structures depicted in the drawing figures, it is contemplated that the thickness or Z-dimensional value will be less than or equal to the wave length of the incident light introduced therein. Width as measured along the y axis may be that suitable to receive and/or emit incident light. The dimension along the x axis is governed by periodicity of the host material in relationship to the length and periodicity of the reflection minimizing layer governed by the parameters outlined in the following discussion.

In the photonic crystal structure disclosed, finite periodicity of the host media in the x direction according to the present parameters coupled with a reflection minimization layer at interface provides a change or modification in the absolute refractive index of the resulting photonic crystal structure as compared to the absolute refractive index of the host media alone.

Here, the media attached to the photonic crystal host media via the matching layer (it is called background media) is dealt with the dielectric material for generalization. In other words, air is one nonlimiting example of material suitable for use as background media. The refractive index, $n_b$, of the background media is unity or larger. In the photonic crystal structure 10 disclosed herein, the length of the reflection minimization layer 16, 16' can be expressed:

$$l_m = (¾)(\lambda_o/|n_m|) \qquad (I)$$

in which $\lambda_o$ is the free space wavelength and $n_m$ is the refractive index of the material employed in the reflection minimization layer. Thus the value employed will be governed as a function of the ¾ waveguide in the length $l_m$ when the absolute refractive index is much less than $n_b$.

The refractive index $n_m$ in equation I can be obtained from the equation:

$$(|n_m|)^2 = |n_b| * |n_h| \qquad (II)$$

in which $|n_m|$ is the absolute refractive index of the reflection minimization layer material assuming infinite length;
$|n_b|$ is the absolute refractive index of the background media; and
$|n_h|$ is derived from the refraction angle in the host material according to Snell's law.

Where more specificity is required, the following equation can be employed:

$$(|n_m| - \delta n_m|)^2 = |n_b| * |n_h| \qquad (III)$$

with $|n_b|$ being the absolute refractive index of the background media and
with $|\delta n_m|$ being the difference between theoretical absolute refractive index (with a reflection minimization layer of infinite length) and absolute refractive index (actual). It is contemplated that $\delta n_m$ is less than 30% of $n_m$.

Refractive index of the host media can be articulated as absolute refractive index ($|n_h|$) and has a value less than 0.2, or more particularly, a value less than 0.1. In particular instances, the value of the absolute refractive index of the host media will be less than 0.085.

The relationship of the value of the radius of the host media dielectric hole ($r_h$) to the value of the radius of the dielectric hole of the reflection minimization layer ($r_m$) is governed by material periodicity and refractive index of the host material. Thus, knowledge of the refractive index $n_h$ of the host material can be employed to derive the attributes of the reflection minimization layer(s).

Assuming photonic crystal with a silicon host material having a refractive index ($n_h$) is −0.07, permittivity ($\epsilon_r$ =11.9); period or pitch (a=0.39$\lambda_o$); and dielectric hole radius ($r_h$=0.44a) in circumstances where $\lambda_o$ is free space wavelength, and air background media, $n_b$1. The reflection minimization layer will have $|n_m| - |\delta n_m| = -0.26$ in Equation III.

In such circumstances, if one assumes that the theoretical refractive index of the reflection minimizing layer as −0.34, and the adjustment for deviation as prepared ($\delta n_m$) should be 0.08.

The reflection minimization layer has the length calculated by the above parameters as $l_m=(\frac{3}{4})(1/0.34)(1/0.39)a=0.566a$ using Equation I. This is a closed value of $(3+0.25)\sqrt{3}a$ (=0.563a), where the periodicity in the x axis is $\sqrt{3}a$ and a is taken to be $0.39\lambda_o$.

Based upon these calculations, assuming a theoretical refractive index $n_m=−0.34$ (with a reflection minimization layer of infinite length) and $r_m=0.45$, then the reflection minimization layer would have 6.5 dielectric rows. Reflection minimization layers with such configurations can be characterized by nonlinear surface characteristics at the air/layer interface similar to that depicted in FIGS. 1 and 2 in which particular dielectric holes characterize and define at least part of the surface of the reflection minimization layer at the air crystal interface. The photonic crystal structure with reflection minimization layers at −x/+x ends exhibit unique and beneficial attributes, particularly at periodicities larger than 20 in the host layer.

Figure 3A:
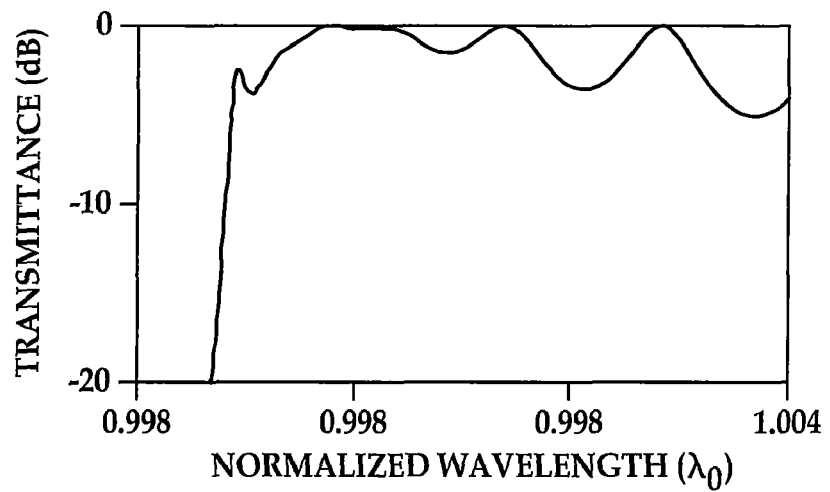
FIG. 3a is a graphic representation of normalized wavelength versus transmittance for reflection minimized photonic crystal structure according to an embodiment of the present invention.
Figure 3B:
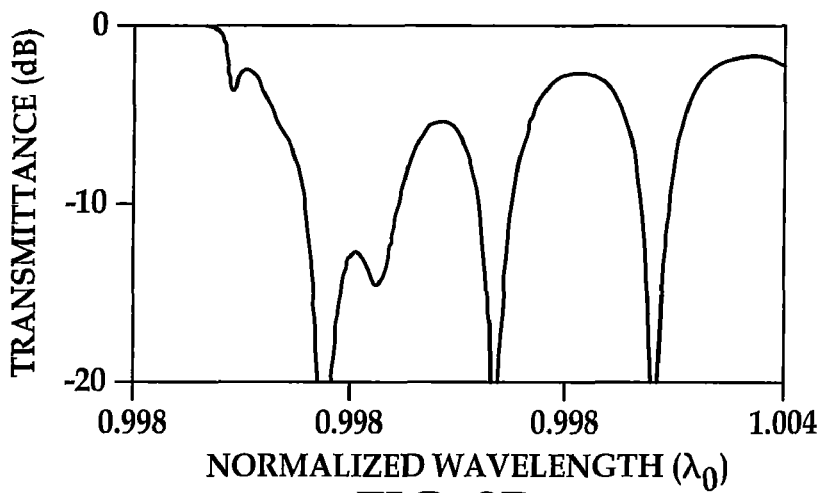
FIG. 3b is a graphic representation of normalized wavelength versus reflectance for reflection minimized photonic crystal structure according to an embodiment of the present invention.
Figure 4A:
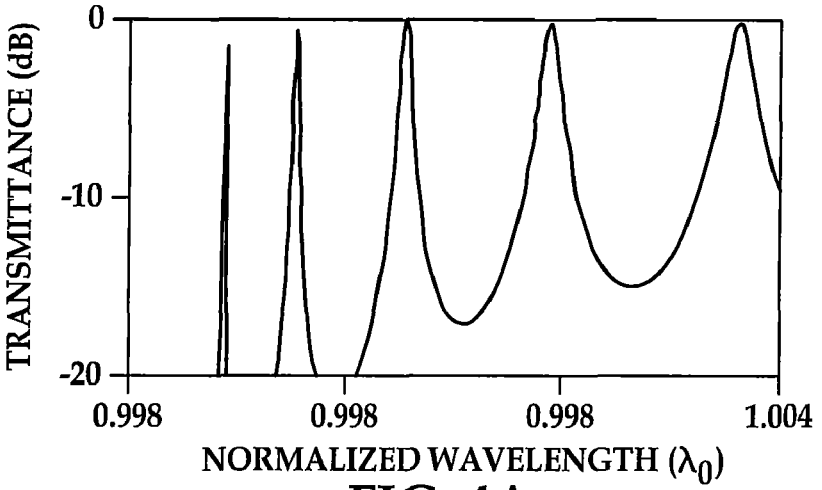
FIG. 4a is a graphic depiction of normalized wavelength versus transmittance for a comparative photonic crystal structure without reflection minimization.
Figure 4B:
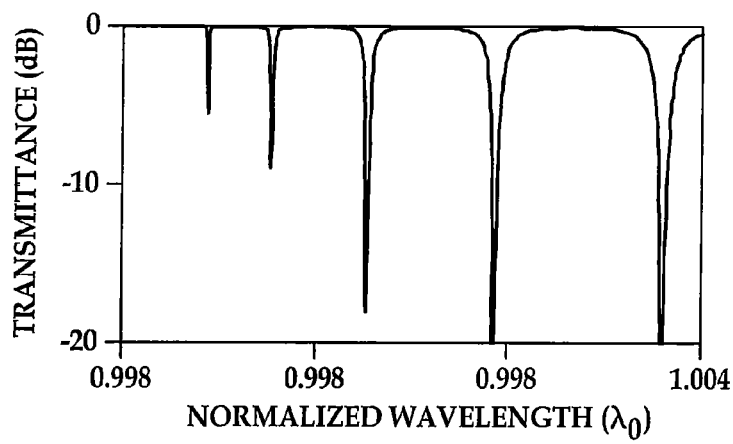
FIG. 4b is a graphic depiction of normalized wavelength versus reflectance for a comparative photonic crystal structure without reflection minimization.
Figure 7A:
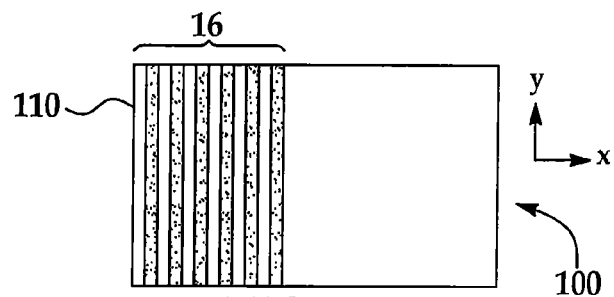
FIG. 7a-e is a representative beam steerable thin structure device employing an embodiment of the photonic crystal structure of the present invention.

General transmittance and reflectance of a photonic crystal structure based on silicon with reflectance minimization layers at −x/+x ends is depicted at FIGS. 3a and 3b. The photonic crystal structure under consideration has a periodicity of 27 in the host media and reflection minimization layers at −x/+x, each with a periodicity of 3.25, with a period of $\sqrt{3}a$ along the x axis. The host media is assumed to have an absolute refractive index of 0.07. These data can be compared to analogous photonic crystal structure without reflection minimization depicted in FIGS. 4a and 4b.

As demonstrated in the graphs, greater and more consistent transmittance across a wide wavelength spectrum occurs when the photonic crystal structure with reflection minimization as disclosed is utilized. Similarly, reflectance of incident light over a wider range of normalized wavelengths is reduced with reflection minimized photonic crystal structure. While the photonic crystal structure without the reflection minimization layers exhibits generally high reflectance, there are periodic dips in the reflectance. The periodic dips evidenced are not due to reflection minimization at the interface. The dips are due to Fabry-Perot resonances that have (1/2) . . . 1 . . . (3/2) . . . guided wavelength in the structure. The reflection minimization is also observable with a 33 periodicity structure. This analysis verifies that the reflection in FIG. 3b was minimized by the reflection minimized photonic crystal structure, not by Fabry Perot resonances.

Figure 5A:
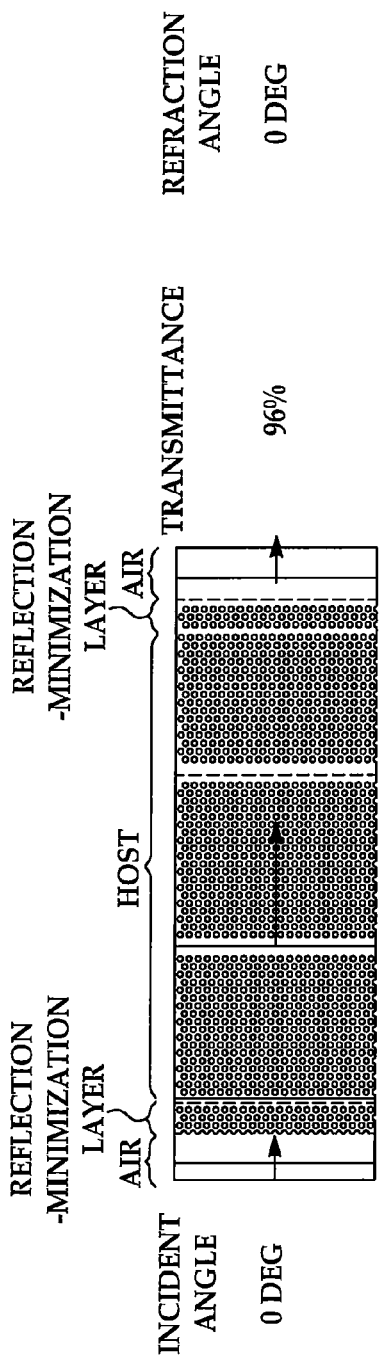
FIG. 5a is a representation of a photonic crystal structure according to an embodiment of the present invention depicting refraction phenomena with an incident angle of 0°.
Figure 5B:
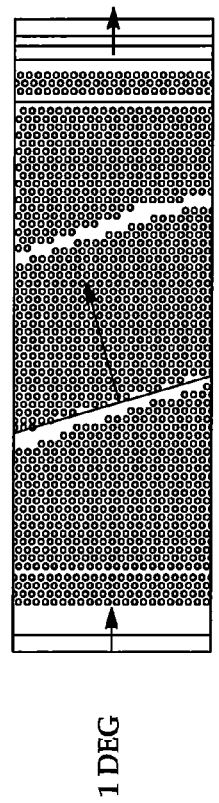
FIG. 5b is a representation of the photonic crystal structure of FIG. 5a depicting refraction phenomena with an incident angle of 1°.
Figure 5C:
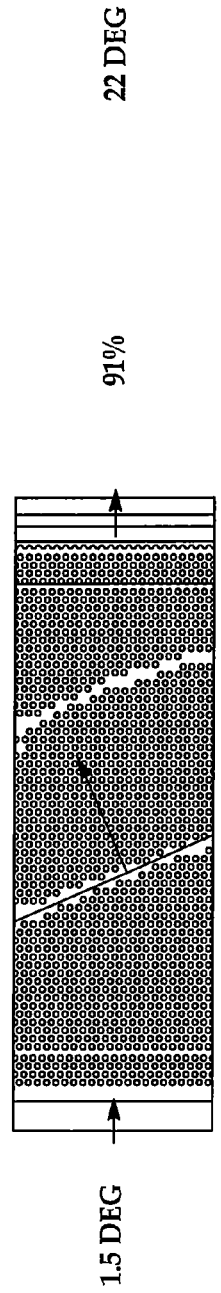
FIG. 5c is a representation of the photonic crystal structure of FIG. 5a depicting refraction phenomena with an incident angle of 1.5°.

The photonic crystal structure as disclosed herein demonstrates advantageous refraction phenomena at various incident angles. FIGS. 5a through 5c depict a photonic crystal structure having a host media with period of 27 and reflection minimization layers at −x/+x with a period of 3.25 as well as the parameters outlined above. The host media has an absolute refractive index of 0.07, a ¾ guided wavelength giving rise to the expression $l_m=(\frac{3}{4})(\lambda_o/|n_m|)$, and absolute refractive indices such that $(|n_m|-|\delta n_m|)^2=\%1\, n_h|$. Incident angles of 0°, 1°, and 1.5° result in refraction angles estimated at 0°, 14°, and 22°. Transmittance is 96%, 96%, and 91% respectively. These data support the utility of the photonic crystal structure as disclosed herein in applications requiring wide beam steering angle and/or high transmittance.

Figure 6:
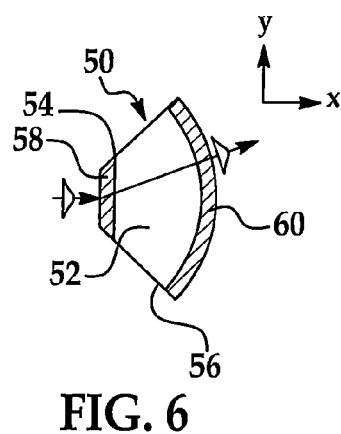
FIG. 6 is a beam steerable structure employing an embodiment of the photonic crystal structure of the present invention.
Figure 7B:
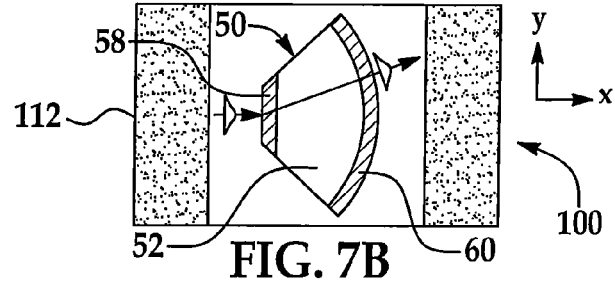
Figure 7C:
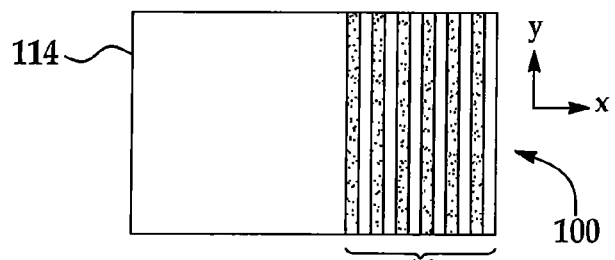

A nonlimiting example of a device employing the photonic crystal structure disclosed herein is the thick lens configuration set forth in FIG. 6. The thick lens configuration has at least one reflection minimization layer located at a host/background interface. A fan shaped lens 50 can be provided having host media 52 with a flat or linear air/host interface region 54 at −x and an opposed convex air host region 56 at +x. The structure has a reflection minimization layer 58 at the air-host media interface 54 and an opposed reflection minimization region 60 at air host interface 56. The host media has dielectric holes having a radius $r_h$ and a pitch $a_h$. The reflection minimization layers can have dielectric holes having a radius $r_m$ and a pitch of $a_m$ where $r_m > r_h$ and $a_m = a_h$.

The host media in photonic crystal structure in the lens 50 can have a periodicity larger than 20 and the reflection minimization layer can have 6.5 rows.

Photonic crystal structures as disclosed herein can be employed as elements in beam steerable structures. Beam steerable structures can also include suitable means for varying the incident angle of a beam of light introduced into the lens 50. Variations in the incident angle can be achieved by any suitable device or apparatus coupled to or associated with the lens 50 to effect discrete movement relative to the incident beam. For example, the lens 50 is moved in the xy plane by microelectromechanical systems (MEMS) devices suitable for the fixed incident beam. Alternately, the travel of the beam can be modified at a point prior to incidence by suitable devices and methodologies.

The lens 50 is a photonic crystal structure having a host media with periodic dielectric holes disposed at a period $a_n$ in which each dielectric hole has a radius $r_n$. The host media has an absolute refractive index less than 0.2. In certain applications the absolute refractive index is less than 0.1 and in others it is less than 0.085.

The reflection minimization layer has a length that is expressed as $l_m=(\frac{3}{4})(\lambda_o/|n_m|)$. It is contemplated that the periodicity of the host media and the reflection minimization layer will be governed in the manner indicated previously.

A beam steerable structure associated with the lens 50 may include a suitable light emitting device. Suitable light emitting devices can include devices configured to emit spatially coherent, low-divergent beams at a given wavelength. In such situations, varying the incident angle at which the beam enters the photonic crystal structure results in significant variation in the exit angle.

Means for varying the angle of incidence of light at entry into the photonic crystal structure can act upon the light source, the intermediate beam, or the photonic crystal structure. Variation in the angle of incidence can also be the result of coordination of one or more of these elements. Means for varying the angle of incidence can be configured such that a change in the incident angle can result in a scanning angle of ±5° from normal with scanning angles of ±10° from normal being employed in certain applications. It is contemplated that the lens 50 and associated beam steerable structures and devices utilizing the photonic crystal structure as disclosed herein can achieve scanning angles of ±20°, with scanning angles of ±25° being possible in certain circumstances.

The various means for varying the angle of incidence at entry to the photonic crystal can be configured to achieve scanning rates in cycles of 10 KHz or less with scanning cycles of 1 KHz and 10 KHz being desired in certain applications.

One nonlimiting example of a beam steerable device is depicted in FIGS. 7a through 7e. The various views of FIG. 7 depict a near-vertical incidence thin-structure beam steerable structure 100 that employs the lens 50 of FIG. 6.

The beam steerable structure 100 is composed of at least a top layer region 110, a middle layer region 112, and a bottom layer region 114. Top layer region 110 and bottom layer 114 are configured with symmetrically opposed gratings 116, 118. Middle layer region 112 is composed of the lens 50 and optional incidence variation mechanisms as desired or required. The lens 50 is immersed in air background. Otherwise, it may be immersed in the dielectric background for the mechanical support. The lens 50 includes a host region 52 and reflectance minimization regions 58, 60, at −x/+x such that reflectance minimization region 58 is proximate grating 116 and reflectance minimization region 60 is proximate grating 118. The structure also includes suitable MEMS devices (not shown) configured to act upon at least one of the lens 50 and/or grating 116.

Figure 7D:
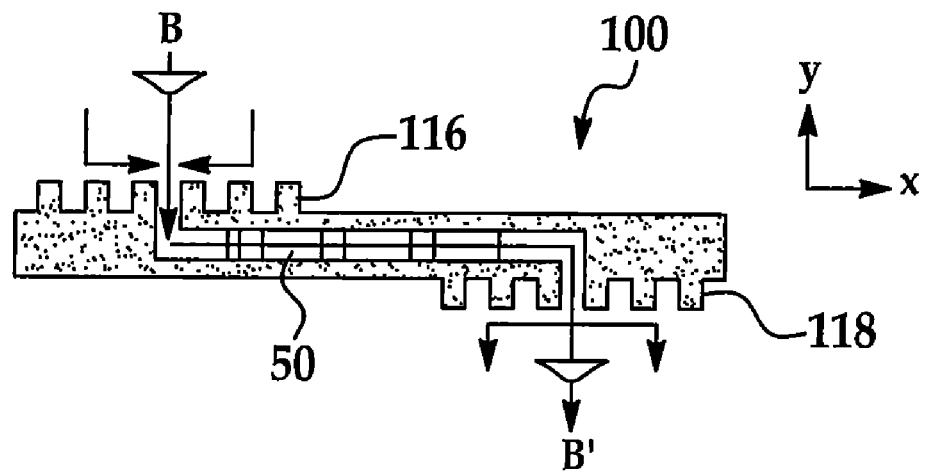
Figure 7E:
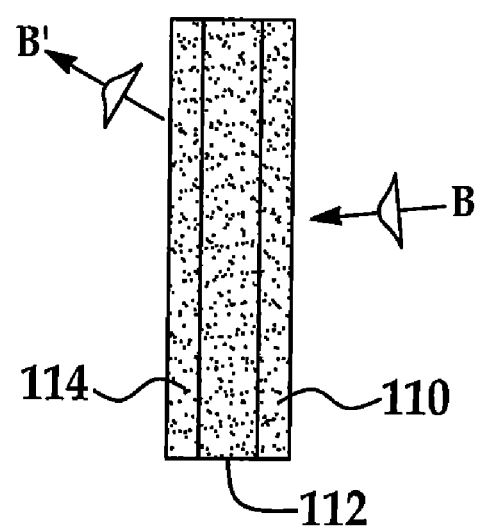

In the embodiment depicted in FIG. 7d, a suitable beam of light B enters through top grating 116 and is directed or redirected through the reflection minimization region 58 of lens 50 at the −x region and passes through host region 56 where it is refracted. The beam exits the lens 50 at reflection minimization region at the +x region. After that point, the refracted beam can be redirected through grating 118 and exit the structure 100.

Minute variations in the incident angle of beam B can result in associated variations in refraction and position of the beam as emitted B'. Cyclical changes that result in changes in this angle of incidence can be accomplished to cause the emitted beam B' to scan along a defined field. The MEMS device(s) can be configured and positioned such that lens 50 is moveable relative to the beam steerable device 100 in the yz plane. It is also contemplated that the MEMS device can act upon structure(s) to alter the angle of incidence for the beam B prior to the lens 50. In the beam steerable structure as set forth in FIG. 7, the emitted beam B' scans over a field in the yz plane. The scanning angle achieved has a value of ±0.5 degrees or greater, with scanning angles greater than ±10 degrees being achieved in specific embodiments. It is also contemplated that scanning angles greater than ±20° can be achieved. In specific instances, it is contemplated that scanning angles greater than ±25° can be utilized.

Also disclosed is a method for minimizing reflection in a photonic crystal structure having an extremely low absolute refractive index that may be expressed as an absolute refractive index less than 0.2. The method includes the step of pairing a photonic host media having a periodicity greater than 20 and periodic dielectric holes disposed at a period $a_h$ with a radius $r_h$ with at least one reflection minimization layer. The reflection minimization layer is positioned at an interface between the host media and background media. The reflection minimization layer with which the host media is paired has an absolute refractive index ($|n_m|$) that differs from the absolute refractive index ($|n_h|$) of the host media. The reflection minimization layer has periodic dielectric holes disposed at a period am. The dielectric holes each have a radius $r_m$ with $a_h=a_m$ and $r_m>r_h$. The length of the paired reflection minimization layer is expressed as:

$$l_m=(3/4)(\lambda/n_m)$$

where $\lambda_o$ is free space wavelength;
$(|n_m|-|\delta n_m|)^2=|n_b|*|n_h|$ in situations where $\delta n_m$ is less than 30% of $n_m$, and $|n_h|$ is absolute refractive index of the background media.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. A photonic crystal structure comprising:
    a host media having periodic dielectric holes disposed at a period $a_h$, each dielectric hole having a radius $r_h$, wherein the host media has an absolute refractive index ($|n_h|$) less than 0.2, the host media associated with a background media;
    at least one reflection minimization layer disposed at an interface between the host media and the background media, the reflection minimization layer having an absolute refractive index ($|n_m|$) that is different from the absolute refractive index of the host media and periodic dielectric holes disposed at a period $a_m$, the dielectric holes each having a radius $r_m$, wherein $a_h=a_m$ and $r_m>r_n$.

2. The photonic crystal structure of claim 1 wherein the background media is air.

3. The photonic crystal structure of claim 1 wherein the absolute refractive index of the host media ($|n_h|$) is less than 0.1.

4. The photonic crystal structure of claim 1 wherein the absolute refractive index of the host media ($|n_h|$) is less than 0.085.

5. The photonic crystal structure of claim 1 wherein the reflection minimization layer has a three quarter guided wavelength.

6. The photonic crystal structure of claim 1 wherein the reflection minimization layer has a length ($l_m$) expressed as:

$$l_m=(3/4)(\lambda_o/|n_m|)$$

wherein $\lambda_o$ is free space wavelength and $(|n_m|-|\delta n_m|)^2=|n_b|*|n_h|$; and $\delta n_m$ is less than 30% of $n_m$ and $|n_h|$ is absolute refractive index of the background media.

7. The photonic crystal structure of claim 6 wherein host media has periodicity larger than 20.

8. The photonic crystal structure of claim 6 wherein the reflection minimization layer has 6.5 dielectric rows and the dielectric holes contains air.

9. The photonic crystal structure of claim 6 consisting of two separate air/host media interfaces at −x and +x, when the crystal structure is disposed in an x/y plane and a beam of light travels through the photonic crystal structure in a direction of −x to +x wherein reflection minimization layers are disposed at each interface.

10. The photonic crystal structure of claim 6 wherein the host media is configured to refract light at an angle up to at least ±20 degrees from normal.

11. A photonic crystal structure comprising:
    a host media having periodic dielectric holes disposed at a period $a_h$, each dielectric hole having a radius $r_h$ and a periodicity larger than 20, wherein the host media has an absolute refractive index ($|n_h|$) less than 0.1;
    at least one reflection minimization layer disposed at an interface between the host media and background media, the reflection minimization layer having a periodic dielectric holes disposed at a period $a_m$, the dielectric holes each having a radius $r_m$, wherein $a_h=a_m$ and $r_m>r_n$; and
    a three-quarter guided wavelength.

12. The photonic crystal structure of claim 11 wherein the reflection minimization layer has a length ($l_m$) expressed as:

$$l_m=(3/4)(\lambda_o/n_m)$$

such that $\lambda_o$ is free space wavelength; and $(|n_m|-|\delta n_m|)^2=|n_b|*|n_h|$ and; $\delta n_m$ is less than 30% and $|n_b|$ is absolute refractive index of the background media.

13. The photonic crystal structure of claim 11 wherein the reflection minimization layer has 6.5 dielectric rows and the dielectric holes contains air.

14. The photonic crystal structure of claim 13 consisting of two separate background media/host media interfaces at −x and +x, when the crystal structure is disposed in an x/y plane and a beam of light travels through the photonic crystal structure in a direction of −x to +x, wherein reflection minimization layers are disposed at each interface.

15. A beam steerable structure comprising:
    a lens configured to receive light at an incident angle and emit light at an angle refracted to the incident angle, the lens composed of the photonic crystal structure of claim 1; and
    means for varying the incident angle at which light is received by the lens.

16. The beam steerable structure of claim 15 wherein the means for varying the incident angle at which light is received by the lens is a MEMS and wherein the lens is fan shaped.

17. The beam steerable structure of claim 16 further comprising:
a top layer and a bottom layer defining a central region, wherein the fan shaped lens is positioned in the central region and is moved by the MEMS, the top and bottom layers each having a grating interface configured for light coupling between the background media and the central region.

18. The beam steerable structure of claim 17 further comprising:
a light source configured to emit a spatially coherent, low-divergence beam.

19. The beam steerable structure of claim 18 wherein the host media of the photonic crystal structure of the lens has periodic dielectric holes disposed at a period $a_h$, each dielectric hole having a radius $r_h$ and at a dielectric periodicity larger than 20, wherein the host media has an absolute refractive index ($|n_h|$) less than 0.1.

20. The beam steerable structure of claim 19 wherein the host media has two separate interfaces at $-x$ and $+x$, when the crystal structure is disposed in an x/y plane and a beam of light travels through the photonic crystal structure in a direction of $-x$ to $+x$ wherein reflection minimization layers are disposed at each interface and wherein each reflection minimization layer has a length ($l_m$) expressed as:

$$l_m = (3/4)(\lambda_o/n_m)$$

such that $\lambda_o$ is free space wavelength; and $(|n_m|-|\delta n_m|)^2 = |n_b|*|n_b|*|n_h|$; wherein $\delta n_m$ is less than 30% of $n_m$ and $|n_b|$ is absolute refractive index of the background media.

21. The beam steerable structure of claim 18 wherein the beam enters the lens at an incident angle and wherein variation in the incident angle results in emission of a refracted beam such that the beam steerable structure has a scanning angle wherein the scanning angle up to $\pm 25°$ and a scanning rate of 1 KHz or greater.

22. A method for minimizing reflection in a photonic crystal structure having an absolute refractive index of less than 0.2 comprising the step of pairing a photonic host media having a periodicity larger than 20 and periodic dielectric holes disposed at a period $a_h$, each dielectric hole having a radius $r_h$ with at least one reflection minimization layer positioned at an interface between the host media and background, the reflection minimization layer having an absolute refractive index that is different from the absolute refractive index of the host media and periodic dielectric holes disposed at a period $a_m$, the dielectric holes each having a radius $r_m$, wherein $a_h=a_m$ and $r_m>r_h$, the reflection minimization layer having a length ($l_m$) expressed as:

$$l_m = (3/4)(\lambda_o/n_m)$$

such that $\lambda_o$ is free space wavelength; and $(|n_m|-|\delta n_m|)^2 = |n_b|*|n_h|$; wherein $\delta n_m$ is less than 30% of $n_m$, and $|n_b|$ is absolute refractive index of the background media.

23. The photonic crystal structure of claim 1 wherein host media has periodicity larger than 20.

24. The photonic crystal structure of claim 1 wherein the reflection minimization layer has 6.5 dielectric rows and the dielectric holes contains air.

25. The photonic crystal structure of claim 1 consisting of two separate air/host media interfaces at $-x$ and $+x$, when the crystal structure is disposed in an x/y plane and a beam of light travels through the photonic crystal structure in a direction of $-x$ to $+x$ wherein reflection minimization layers are disposed at each interface.

26. The photonic crystal structure of claim 1 wherein the host media is configured to refract light at an angle up to at least $\pm 20$ degrees from normal.

* * * * *

UNITED STATES PATENT AND TRADEMARK OFFICE
CERTIFICATE OF CORRECTION

PATENT NO. : 8,369,000 B2  
APPLICATION NO. : 12/708860  
DATED : February 5, 2013  
INVENTOR(S) : Hideo Iizuka et al.

Page 1 of 1

It is certified that error appears in the above-identified patent and that said Letters Patent is hereby corrected as shown below:

Title page, Item (73) Assignee, please add a second assignee --The Trustees of the University of Pennsylvania, Philadelphia, PA (US)--.

Signed and Sealed this
Twentieth Day of August, 2013

Teresa Stanek Rea
*Acting Director of the United States Patent and Trademark Office*